United States Patent [19]

Olsson

[11] Patent Number: 5,477,523
[45] Date of Patent: Dec. 19, 1995

[54] METHOD AND A DEVICE FOR ALTERING OF THE ANGULAR VELOCITY OF A DRIVEN ROTATING MEDIA CARRIER

[76] Inventor: Lennart Olsson, Förridargatan 13, S-216 21 Malmö, Sweden

[21] Appl. No.: 117,135
[22] PCT Filed: Feb. 17, 1992
[86] PCT No.: PCT/SE92/00095
§ 371 Date: Sep. 14, 1993
§ 102(e) Date: Sep. 14, 1993
[87] PCT Pub. No.: WO/9217883
PCT Pub. Date: Oct. 15, 1992

[30] Foreign Application Priority Data

Mar. 26, 1991 [SE] Sweden ............... 91009043

[51] Int. Cl.$^6$ .................................................. G11B 19/28
[52] U.S. Cl. ............................. 369/241; 369/267
[58] Field of Search ............................ 369/267, 239, 369/240, 243, 241

[56] References Cited

U.S. PATENT DOCUMENTS 3,947,625  3/1976  Greve .............................. 369/267
4,416,006  11/1983  Kitamura et al. .................. 369/267

FOREIGN PATENT DOCUMENTS 245425  7/1947  Switzerland.

*Primary Examiner*—John H. Wolff
*Assistant Examiner*—George J. Letscher
*Attorney, Agent, or Firm*—Burns, Doane, Swecker & Mathis

[57] ABSTRACT

A rotating media carrier system includes a rotating media carrier having an axis of rotation, a mass connected to the media carrier, and a device for adjusting a radial position of the mass with respect to the axis of rotation. The system further includes a device for rotating the media carrier and the mass, wherein the rotating media carrier and the mass are connected to the device for rotating such that the rotating media carrier rotates at an angular velocity that is different than the mass at any given time.

9 Claims, 1 Drawing Sheet

METHOD AND A DEVICE FOR ALTERING OF THE ANGULAR VELOCITY OF A DRIVEN ROTATING MEDIA CARRIER

BACKGROUND OF THE INVENTION

This invention concerns a method to reduce the access time for rotating storage media with variable angular velocity by displacement of existing kinetic energy, while at the same time the energy consumption is being reduced. The access time for rotating storage media is based on a radial displacement of the reading head and a pending of the correct position of the rotating disc (turning). In order to put a maximum amount of information on a circular, rotating disc surface, some storage media have been constructed according to the CLV (Constant Linear Velocity) method, i.e., the disc is read at a constant velocity along the track, thus constantly changing its angular velocity at recording or reading at different radial distances. Disc storage media with a partition in sectors could have the number of sectors as a step by step function of the radius.

The invention could for example be used on discs of the Compact Disc type, which under continuous reading constantly change their angular velocity by keeping a constant reading speed along the information track. For applications of Compact Discs on computers, so-called CD-ROM, the angular velocity of the disc must in a short time and frequently be altered at each reading, as the information normally is scattered on different locations and thus at different radii on the disc.

Certain sectorized storage media with an extended number of sectors with a extended number of radii also require a change of the angular speed at recording or reading at different radii. Normally a relatively large quantity of energy and a powerful driver unit are required in order to alter the angular velocity in a short time.

The cost for this is traditionally relatively high. Forces of actions and reactions often cause vibrations and thus interferences easily may arise when reading.

OBJECTS AND SUMMARY

A purpose of the invention is to at a low cost considerably reduce the access time in machines of the above mentioned types. The purpose is achieved by the method and the device in accordance with the applications for the patent.

BRIEF DESCRIPTION OF THE DRAWINGS

The invention will be described below with reference to enclosed drawings, where.

DESCRIPTION OF PREFERRED EMBODIMENTS

Figure 1A:
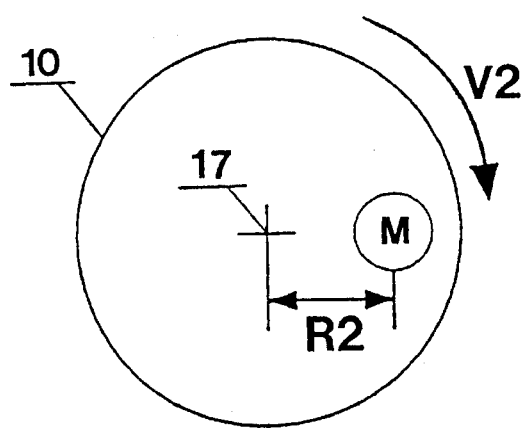
FIGS. 1a and 1b show the concept and FIG. 2 schematically shows how this is done in practice.
Figure 1B:
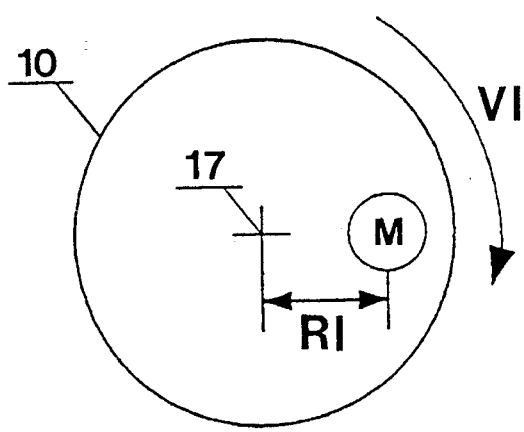

T rotating system is provided with one or more masses M (FIG. 1a and 1b), attached so that they can be moved radially from the axis of rotation (17), shown at R1 and R2, altering the angular velocity without considerable supply of energy, without forces of reaction and in a very short time.

There is also a possibility to store the energy and have it transferred by Other means to the rotating system, but in a way that does not affect the energy at a changed angular velocity. Thus this concerns a system with a constant energy and an altering rotating inertia.

Figure 2:
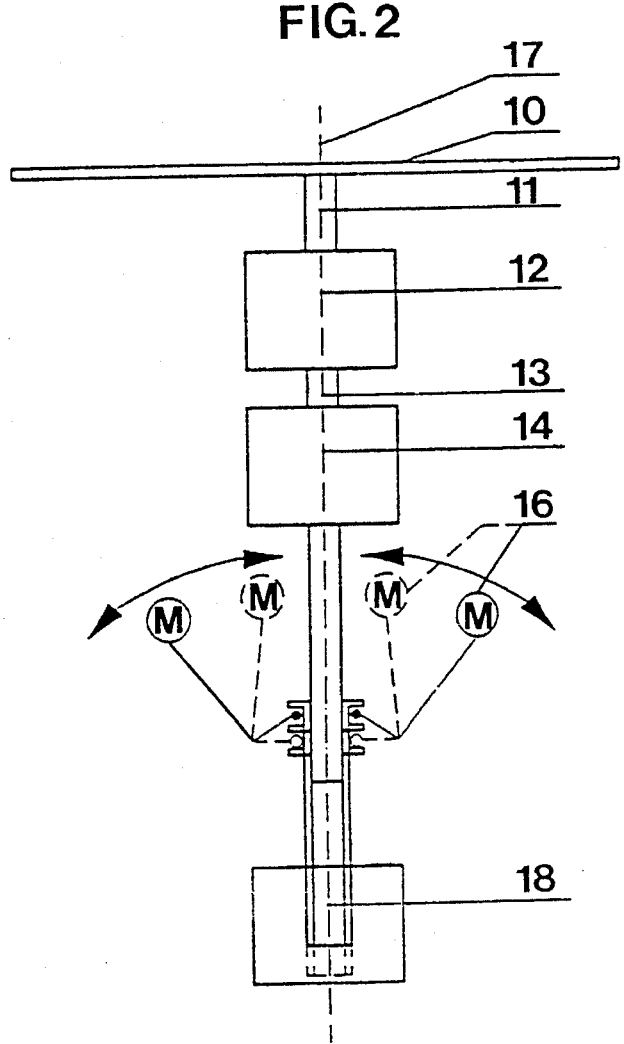

FIG. 2 shows in detail how this is achieved in practice. Reference numeral (10) represents a disc, connected to the end of a centrally placed spindle (11), which at its other end is a part of a driving gear (12). The spindle (13) protruding from driving gear (12) is connected to a system of at least one weight (16), which can be moved radially towards the axis of rotation (17) by means of an electromagnet or a stepping motor (18). A motor (14) supplies the system with the energy necessary for rotation.

When a change of angular velocity for (10) and (11) is desired, energy can be transferred by a change of the radial position of at least one weight (16) by the electromagnet or stepping motor (18).

The driving gear (12) changes the relationship between the angular velocity for at least one weight (16) and the disc (10) and the spindle (11), so that energy requirements are less for the radial transfer of at least one weight (16), than had they been mounted direcly on the spindle (11).

I claim:

1. A method for altering the angular velocity of a driven rotating media carrier about an axis of rotation of the media carrier, comprising the steps of:

connecting a mass to the media carrier such that a position of the mass in relation to the axis of rotation of the media carrier may be adjusted and including a gear between the mass the media carrier so that the mass can rotate at a different angular velocity than the media carrier;

simultaneously rotating said media carrier at a first angular velocity and rotating said mass at a second angular velocity that is different than said first angular velocity; and adjusting the radial position of the mass in relation to the axis of rotation.

2. The method of claim 1, wherein said rotating step is effected by the use of a motor, and a gear is interposed between the motor and the media carrier to create a different angular velocity for the mass and the media carrier.

3. A rotating media carrier system, comprising:

a rotating media carrier having an axis of rotation;

a mass connected to the media carrier;

means for adjusting a radial position of the mass with respect to the axis of rotation;

means for rotating the rotating media carrier and the mass;

means for connecting said rotating media carrier to said mass such that the rotating media carrier rotates at a different angular velocity than the mass at any given time, said connecting means includes a gear arranged between said rotating media carrier and said mass.

4. The system of claim 3, wherein the adjusting means includes an electromagnet.

5. The system of claim 3, wherein the adjusting means includes a stepping motor.

6. The system of claim 3, wherein the mass includes two weights mounted diametrically opposite to each other with respect to the axis of rotation.

7. The system of claim 3, wherein the adjusting means includes an electromagnet.

8. The system of claim 3, wherein the adjusting means includes a stepping motor.

9. The system of claim 3, wherein the mass includes two weights mounted diametrically opposite to each other with respect to the axis of rotation.

* * * * *